(12) United States Patent
Videlov

(10) Patent No.: US 7,644,129 B2
(45) Date of Patent: Jan. 5, 2010

(54) PERSISTENCE OF COMMON RELIABLE MESSAGING DATA

(75) Inventor: Vladimir Videlov, Sofia (BG)

(73) Assignee: SAP AG, Walldorf (DE)

( * ) Notice: Subject to any disclaimer, the term of this patent is extended or adjusted under 35 U.S.C. 154(b) by 320 days.

(21) Appl. No.: 11/757,068

(22) Filed: Jun. 1, 2007

(65) Prior Publication Data

US 2008/0301705 A1    Dec. 4, 2008

(51) Int. Cl.
*G06F 15/16* (2006.01)
*G06F 12/00* (2006.01)
(52) U.S. Cl. .................... 709/207; 709/206
(58) Field of Classification Search ............... 709/206, 709/207, 238, 217–219
See application file for complete search history.

(56) References Cited

U.S. PATENT DOCUMENTS

| 2005/0193222 A1* | 9/2005 | Greene ................. 713/201 |
| 2006/0133278 A1* | 6/2006 | Hill et al. ............. 370/235 |
| 2006/0150200 A1* | 7/2006 | Cohen et al. .......... 719/328 |
| 2008/0288956 A1* | 11/2008 | Videlov ............... 719/313 |
| 2008/0295117 A1* | 11/2008 | Videlov ............... 719/328 |
| 2008/0307056 A1* | 12/2008 | Videlov ............... 709/206 |

* cited by examiner

*Primary Examiner*—Zarni Maung
(74) *Attorney, Agent, or Firm*—Blakely, Sokoloff, Taylor & Zafman LLP

(57) ABSTRACT

Method and system for processing single WS-RM sequence by a plurality of clustered application server instances, sharing persisted RM sequence data related to WS-RM protocol. The common RM sequence data, associated with a plurality of RM requests is cached in a buffer that is associated with an application server instance. An independent messaging system is associated with the application server instance to handle RM common data persistence in WS-RM protocol implementation.

12 Claims, 3 Drawing Sheets

PERSISTENCE OF COMMON RELIABLE MESSAGING DATA

FIELD OF INVENTION

The field of invention relates generally to the software arts, and, more specifically, to Web services reliable message processing.

BACKGROUND

The term "Web service" is understood to mean a software system designed to support interoperable machine-to-machine interaction over a network. The Web service is a standardized service encapsulating the functions of an application in such a way that other applications can locate and access the service. Web services (WS) are used also for implementing a service oriented architecture (SOA) for engaging business relationships (e.g., buying and selling) in a partially or wholly automated fashion over a public network such as the Internet ("the Web"). Generally, in WS SOA, a service consumer (or service requester) endpoint and a service provider endpoint exchange messages over a network.

The conversation, i.e. the message exchange, between a service consumer and a service provider could be hampered by many errors. Some of the messages could be lost, others duplicated or reordered, or one of the host systems (either the service requester or provider) may experience failures and lose volatile state information. Web Services Reliable Messaging (WS-RM) is a protocol specification for reliable delivery of messages from source to destination endpoints. The list of interoperability organizations that have originally contributed to the WS-RM specification development include IBM, Microsoft, BEA Systems and Tibco. Currently it is submitted to the Organization for the Advancement of Structured Information Standards (OASIS). When supported by both the source and the destination endpoints, the WS-RM protocol provides a way to establish delivery assurance in Web Services.

To track and manage the reliable delivery of messages, the WS-RM protocol groups exchanged messages in sequences (WS-RM sequences). The sequences include application messages that carry business information and protocol messages, necessary for administrating the messages exchange. In this document the term RM request is used to refer to an application message in a sequence. Each sequence has a unique identifier and each application message in a sequence (RM request) has a number. According to the WS-RM protocol specification, a sequence identifier is generated and communicated between the endpoints prior to transmission of the messages grouped in the sequence. In case of an unsuccessful message delivery, for example, when not all sent RM requests from a sequence are delivered, the WS-RM protocol implementation takes appropriate action like repeating the send operation.

RM sequence data, comprising sequence identifier and message numbers, is persisted and used for tracking the delivery of messages during a reliable conversation until a "successful sequence transmission" or "transmission expiration" event occurs. Persistence considerations related to an endpoint's ability to satisfy the delivery assurance are the responsibility of the WS-RM protocol implementation and as such they are not part of the protocol specification.

To achieve optimal performance and scalability, WS applications are often run on clusters of application server instances. An additional consideration for the WS-RM protocol implementation is how a single RM sequence is to be processed by a plurality of clustered application server instances sharing common persisted data, while still maintaining the advantages of the cluster environment like load balancing, dynamic cache of the information loaded from and stored to shared database, etc.

SUMMARY

A method and system for a plurality of clustered application server instances to process a WS-RM sequence and share persisted RM sequence data related to WS-RM protocol are described. The common RM sequence data, associated with a plurality of RM requests is cached in a buffer associated with an application server instance. An independent messaging system is associated with the application server instance to handle RM common data persistence in an WS-RM protocol implementation.

BRIEF DESCRIPTION OF THE DRAWINGS

A better understanding of the present invention can be obtained from the following detailed description in conjunction with the following drawings, in which.

DETAILED DESCRIPTION

Embodiments of a method and system for a plurality of clustered application server instances to process a WS-RM sequence and share persisted RM sequence data related to WS-RM protocol are described herein.

When the WS-RM protocol is implemented in an environment of clustered application server instances, processing of the RM requests in one sequence by different server instances is possible and even desirable for load balancing and better performance. To achieve this, the RM data is persisted so that it is accessible to all active application server instances. In one embodiment of the invention, the persisted RM data is stored and accessed by all application server instances of a cluster on a common database. An independent messaging system (IMS) is coupled with the WS-RM protocol implementation to provide persistency of the common RM sequence data. The efficiency of the WS-RM protocol implementation is improved, in an embodiment of the invention by providing a data holder for wholly or partially caching the persisted RM data.

Figure 1:
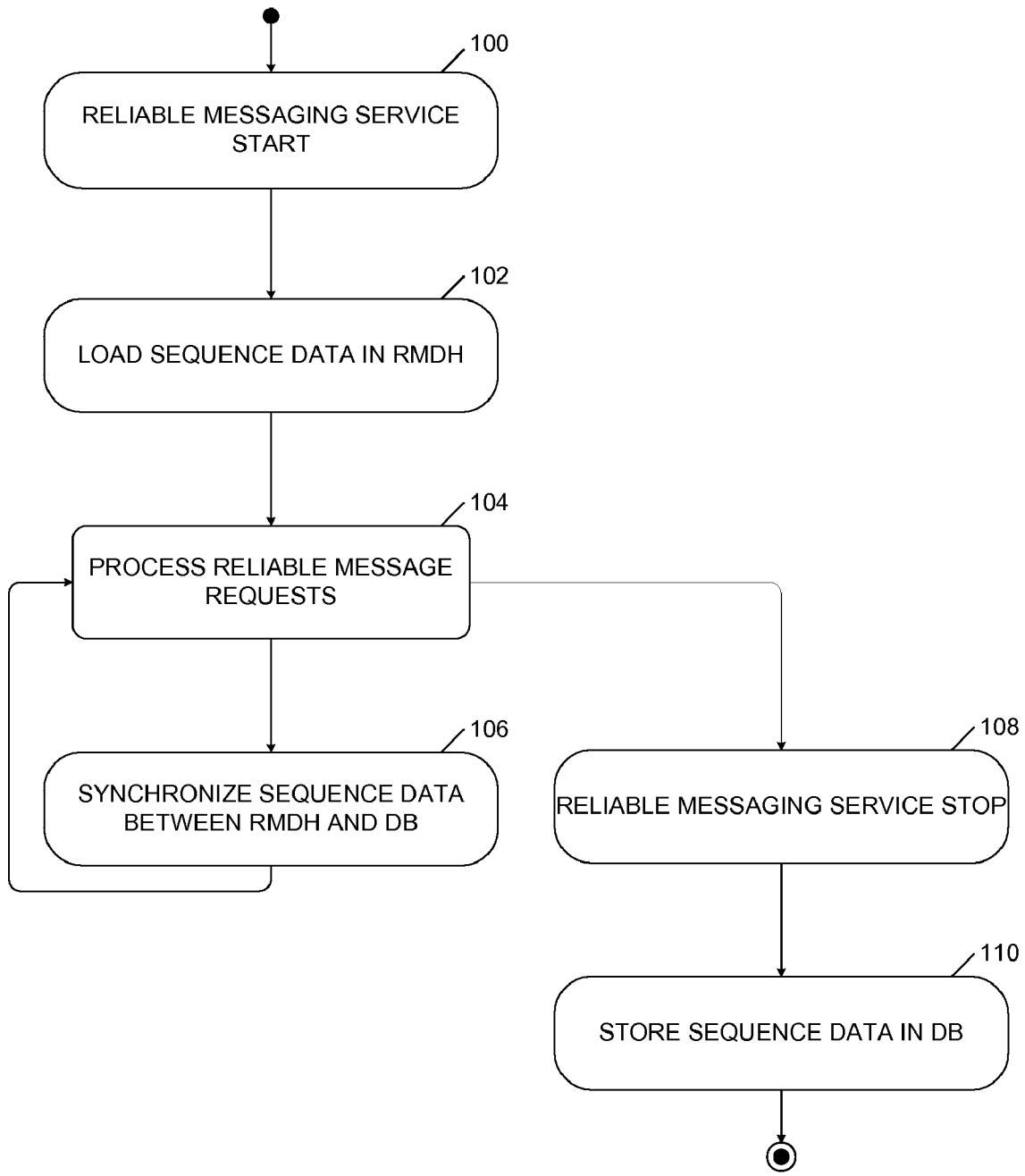
FIG. 1 is a flowchart that illustrates the steps in common RM sequence data caching related to RM requests processing associated with an application server instance.

FIG. 1 illustrates the steps in caching common RM sequence data. An application server instance starts WS-RM protocol support in process block 100. In process block 102 a reliable messaging data holder (RMDH) associated with the application server instance is loaded with persisted RM sequence data from the common database. The persisted RM sequence data provides for tracking and managing reliable delivery of the currently exchanged messages. In process block 104 the application server instance starts receiving and processing RM requests.

The RM sequence data in the RMDH is dynamically updated by two events. The first event is saving the newly generated (or novel) RM sequence data, carried by the received RM requests. The second event is the periodic synchronization of the RM sequence data between the RMDH and the common database in process block 106. Synchronization in this description means storing the novel RM sequence data from the RMDH to the common database and loading RM sequence data currently updated by other application server instances in the database to the RMDH. When the application server instance terminates the WS-RM protocol support and ends RM requests processing, the RM service is stopped in process block 108. Then at process block 110, the remaining unsynchronized novel RM sequence data from the RMDH is stored to the common database.

Figure 2:
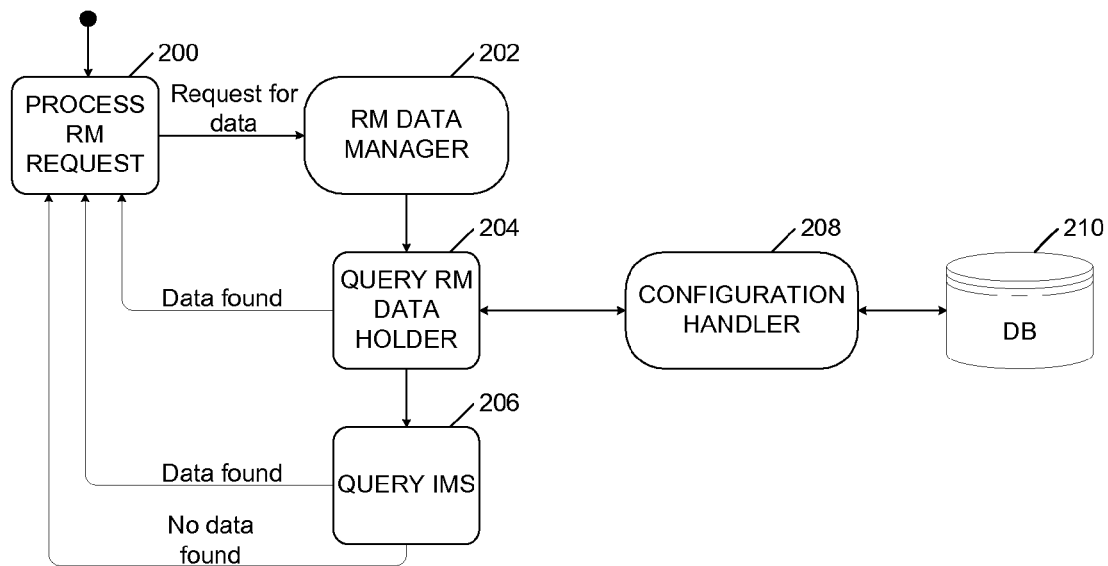
FIG. 2 is a flowchart that illustrates the process of querying for RM common data during RM request processing, associated with an application server instance.

Access to relevant RM sequence data is provided to process a RM request from a WS-RM sequence. FIG. 2 illustrates providing that access. At 200 a RM request is received for processing in an application server instance. At 202 RM sequence data associated with the RM is passed to a reliable messaging data manager (RMDM) associated with the application server instance. Then at 204 the RMDM queries the RMDH, associated with the application server for sequence data, relevant to the RM request in process. If the RMDH does not provide the sequence data, at 206 the RMDM queries the independent messaging system in communication with the application server instance. The IMS is used for managing RM sequence data persistence in one embodiment of the invention. The RM request is processed if any of the queries in 204 or 206 provide relevant RM sequence data. Otherwise, the RM request processing is aborted.

Step 208 shows the synchronization between the RMDH and the common database. An interface object, referred as configuration handler in this specification, is associated with the application server instance. When triggered, the configuration handler loads updated RM sequence data from the common database to the RMDH or extracts novel RM sequence data from the RMDH and stores it to the common database. Step 210 illustrates the read and write processes in the common database.

Figure 3:
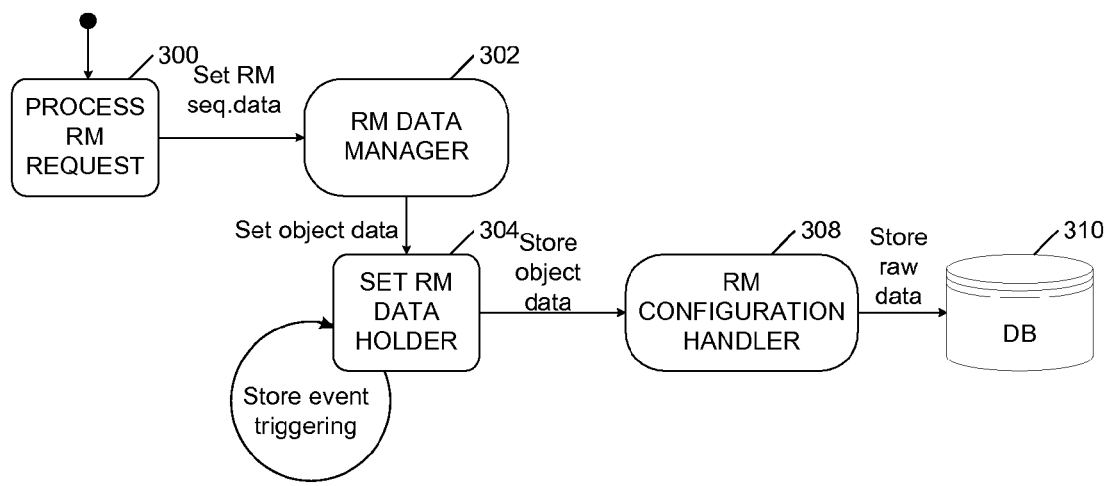
FIG. 3 is a flowchart that illustrates the process for storing RM common data during RM request processing, associated with an application server instance.

For delivery assurance it is important to remember and make available to all application server instances the information about the processed messages from a sequence. FIG. 3 describes the process of sending novel sequence data to the RMDH and consequently to the common database. At 300 an application server instance processes an RM request. The RM sequence data associated with the RM request is passed to the RMDM in 302. Then at 304 the RMDM stores the received RM sequence data in the RMDH buffer. Triggered by an event, the stored sequence data in RMDH is transferred by the configuration handler interface 308 to the common database 310.

Figure 4:
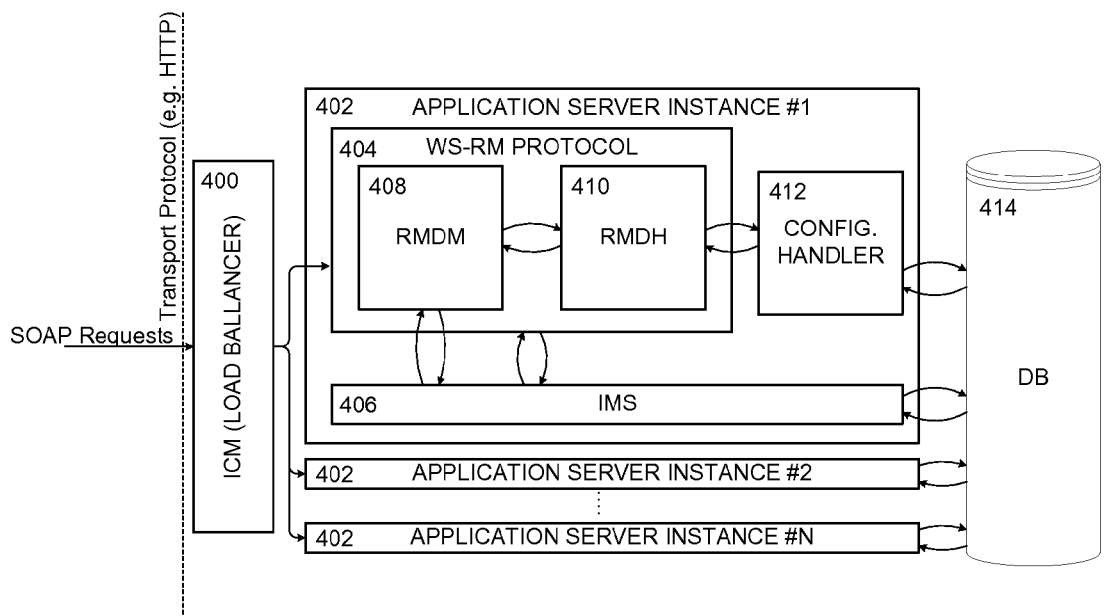
FIG. 4 is a block diagram that illustrates a processing system that implements WS-RM protocol over clustered application server instances and persistent RM common data caching.

FIG. 4 is a block diagram illustrating a RM processing system of clustered application server instances. The system includes Internet communication manager (ICM) or load balancer 400, a plurality of application server instances 402 and common database 414 accessible by all clustered application server instances.

The ICM (load balancer) in 400 receives System Object Access Protocol (SOAP) requests that are organized as sequences of RM requests. SOAP is a standard protocol for exchanging Extensible Markup Language (XML) based messages over computer networks, specified by the World Wide Web Consortium (W3C). Each RM request is forwarded to an application server instance 402 in accordance with established load balancing rules. The RM request is directed to WS-RM protocol implementation 404 associated with an application server instance. An independent messaging system (IMS) coupled with the WS-RM implementation for processing RM requests is shown in 406.

When a RM request is received in an application server instance, the RMDM 408 queries the RMDH 410 for the relevant persisted RM sequence data, used by delivery assurance algorithms. When the first RM request from a sequence is processed, the IMS generates and persists RM sequence data directly in the common database and just after that it is buffered in the RMDH. For this reason, in one embodiment of the invention, if no data is provided, the RMDM redirects the same query to the IMS. RM request processing continues if the RMDH or the IMS provide the RM sequence data, otherwise is aborted.

The configuration handler 412 represents an interface that facilitates the synchronization of the data between the RMDH buffer 410 and the common database 414, accessible by all application server instances.

Figure 5:
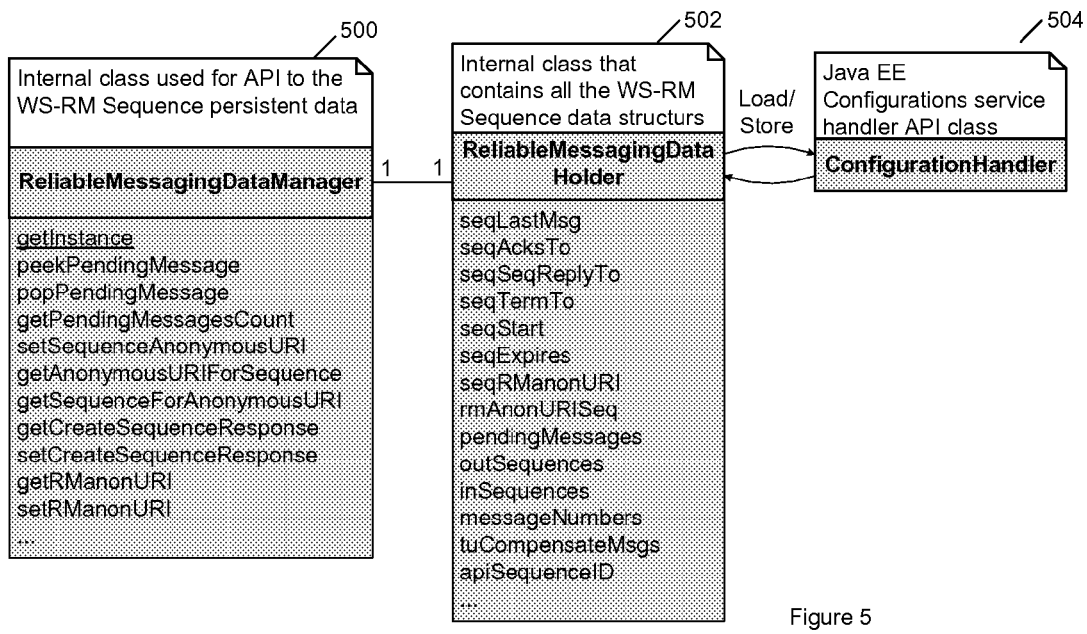
FIG. 5 is a block diagram that illustrates the software objects responsible for RM common data caching associated with an application server instance.

FIG. 5 illustrates the data structure and connection between RMDM 500, RMDH 502 and configuration handler 504 objects in one embodiment of the invention. They are presented as Java EE classes.

In the above description numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Reference throughout this specification to "one embodiment" or "an embodiment" means that a particular feature, structure or characteristic described in connection with the embodiment is included in at least embodiment of the invention. Thus, the appearance of the phrases "in one embodiment" or "in an embodiment" in various places throughout this specification are not necessarily all referring to the same embodiment. Furthermore, the particular features, structures or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. "Caching" is defined herein as process of dynamically storing and refreshing data in a software established buffer or data holder.

What is claimed is:

1. A method, comprising:
   receiving a reliable message request at one of a cluster of application server instances;
   querying a data holder associated with the application server instance for sequence data associated with the reliable message request;
   querying an independent messaging system in communication with the application server instance for the sequence data if the reliable message data holder does not provide the sequence data; and
   updating the reliable messaging data holder with sequence data associated with a plurality of reliable message requests.

2. The method of claim 1, further comprising:

processing the reliable message request if one of the reliable messaging data holder and the independent messaging system provide the sequence data associated with the reliable message request responsive to the respective queries; and aborting the reliable message request if the reliable messaging data holder and the independent messaging system fail to provide the sequence data associated with the reliable message request responsive to the respective queries.

3. The method of claim 1, wherein querying for the sequence data comprises:

querying for a sequence identifier and a message number.

4. The method of claim 1, wherein updating the reliable messaging data holder comprises:

retrieving from a database accessible to the application server instances in the cluster the sequence data for the plurality of reliable messages;

synchronizing contents of the reliable messaging data holder associated with the application server instance with the retrieved sequence data for the plurality of reliable messages.

5. The method of claim 4, wherein synchronizing comprises:

synchronizing the contents of the reliable messaging data holder with the database responsive to one of an event or an elapse of a period of time.

6. The method of claim 5, wherein synchronizing the contents comprises:

synchronizing the contents of the reliable messaging data holder associated with the application server instance with the retrieved sequence data for the plurality of reliable messages, persisted in a database as raw data, the raw data selected from a group of data elements consisting of strings and integers.

7. An apparatus comprising:

an interface to receive a reliable message request and forward the request to one of a plurality of application server instances;

a reliable message data holder associated with the application server instance to receive a query therefrom for sequence data associated with the forwarded reliable message request;

an independent messaging system coupled in communication with the application server instance to receive a query therefrom for the sequence data if the reliable message data holder does not maintain the sequence data; and an interface associated with an application server instance coupled to the reliable message data holder to synchronize its contents with a database, accessible by all application server instances.

8. The apparatus of claim 7, wherein each of the plurality of application server instances are compatible with the Java Enterprise Edition programming platform.

9. The apparatus of claim 7, wherein the reliable message data holder is a Java EE compatible class that comprises sequence identifier and message number reliable messaging data structures.

10. The apparatus of claim 7, further comprising:

a reliable messaging data manager associated with the application server instance to query the reliable messaging data holder and the independent messaging system in accordance with the received reliable message request.

11. The apparatus of claim 10, wherein the reliable message data manager is a Java EE compatible class that provides an application programmatic interface (API) to access reliable messaging sequence data structures.

12. The apparatus of claim 7, wherein the interface to synchronize a reliable messaging data holder contents with a database comprises:

a Java EE Configurations compatible service handler application programmatic interface (API) class to synchronize the contents of the reliable messaging data holder and the database.

* * * * *